United States Patent
Sato et al.

(10) Patent No.: US 7,147,828 B2
(45) Date of Patent: Dec. 12, 2006

(54) REACTOR

(75) Inventors: Noritaka Sato, Kanagawa (JP);
Tsutomu Noguchi, Kanagawa (JP)

(73) Assignee: Sony Corporation, Tokyo (JP)

( * ) Notice: Subject to any disclaimer, the term of this patent is extended or adjusted under 35 U.S.C. 154(b) by 531 days.

(21) Appl. No.: 10/239,542

(22) PCT Filed: Jan. 23, 2002

(86) PCT No.: PCT/JP02/00451

§ 371 (c)(1),
(2), (4) Date: Apr. 8, 2003

(87) PCT Pub. No.: WO02/058836

PCT Pub. Date: Aug. 1, 2002

(65) Prior Publication Data

US 2003/0155999 A1    Aug. 21, 2003

(30) Foreign Application Priority Data

Jan. 23, 2001  (JP) .............................. 2001-14306

(51) Int. Cl.
*B01J 3/00* (2006.01)
*B01J 19/00* (2006.01)

(52) U.S. Cl. ...................... 422/242; 422/129; 422/118

(58) Field of Classification Search ................. 422/242
See application file for complete search history.

(56) References Cited

FOREIGN PATENT DOCUMENTS

| | | |
|---|---|---|
| JP | 06031155 A * | 2/1994 |
| JP | 07313987 | 12/1995 |
| JP | 200239408 | 2/2002 |

OTHER PUBLICATIONS

Machine Translation of JP 07-313987 A (Dec. 5, 1995).*

* cited by examiner

*Primary Examiner*—Glenn Caldarola
*Assistant Examiner*—Jennifer A. Leung
(74) *Attorney, Agent, or Firm*—Sonnenschein Nath & Rosenthal LLP (57) ABSTRACT

A reactor comprising a reacting vessel 31 that contains a fluid including high temperature and high pressure water under target reaction temperature and reaction pressure condition and performs a reaction treatment to a reactant by the fluid, a first pipe 25 connected to the reacting vessel 31 to supply the reactant to the reacting vessel 31, and a first partition means 50 for partitioning between first pipe 25 and the reacting vessel 31 so as to prevent a leakage of any one of the fluid, the reactant, and a reaction product from the reacting vessel 31 side to the first pipe 25 side. The first partition means 50 is comprised of for example a valve 51, a shaft 52, a weight 53, a supporting member 54, and a pipe 55, and normally, due to the weight 53, the valve 51 closes an opening of a bottom end of the pipe 55. That is, it isolates the pipe 55 and the inside of the reacting vessel 31. At this time, although the valve 51 does not completely seal up the inside of the reacting vessel 31, it has the ability to prevent a large amount of hot water HW in the reacting vessel 31 from leaking into the pipe 25 due to a convection current thereof.

7 Claims, 10 Drawing Sheets

⧖ : VALVE OPEN

⬛ : VALVE CLOSE

⧖ : VALVE OPEN

⬤ : VALVE CLOSE

PRIOR ART

REACTOR

TECHNICAL FIELD

The present invention relates to a reactor that performs reaction treatment to a reactant by using, for example, supercritical water or hot water under predetermined temperature and pressure condition.

BACKGROUND OF THE INVENTION

A supercritical fluid is any substance above its critical temperature and critical pressure, exhibits properties considerably different from a fluid under a normal condition, and distinctive phenomena may be seen in its reaction characteristics also when used as a reaction area. Decomposing organic substances such as fluorocarbon gas, dioxin, and PCB (compound of polychlorobiphenyl) by using water of near-critical or supercritical condition is disclosed in Japanese Patent Application (Kokai) No. 2001-149767.

As the supercritical fluid, for example, when water is used to form a supercritical fluid, water becomes supercritical water when it exceeds high temperature and high pressure condition of a temperature at 374° C. and pressure at 22 MPa. Such supercritical water possesses properties of both vapor and water, and is capable of dissolving organic substances. Recently, research and development to oxidize and decompose substances such as PCB and dioxin in supercritical water is being conducted to make use of such properties.

A significant condition when conducting such reaction is temperature and pressure.

In many cases, by changing the condition of the temperature, it is possible to cause different reactions to the reactant.

Further, even in hot water of near-critical condition not reaching the supercritical condition, it is possible to cause a distinct reaction dependent on that temperature and pressure condition.

Note that in the present specification, the meaning of the term "hot water" other than supercritical water, also includes water capable of causing a distinct reaction dependent on temperature and pressure condition such as those of the above near-critical condition.

Further, it is possible to cause a different reaction by adding some type of additive into the water or to the reactant. Note that "different reaction" herein in addition to mainly meaning a reaction producing different products of reaction, in a broad sense, it also means a reaction of different reaction speed and a reaction of different yield of the reaction product even when producing the same reaction product.

When treating mass reactants, the so-called continuous type apparatus is often used. Normally, the reactant is transformed into a slurry by a pre-process, and the reactant together with water are successively fed into the apparatus to be highly pressurized, gradually heated by a heater around a pipe, reaction occurs when heated to the target temperature, and then successively discharged from the apparatus after cooling.

In an apparatus such as the above one, because the reactants are gradually heated, before reaching the target temperature condition, the passing of the reactants through a temperature that is lower than the target temperature cannot be avoided and therefore a reaction not aimed at may occur in the low temperature condition.

Figure 8:
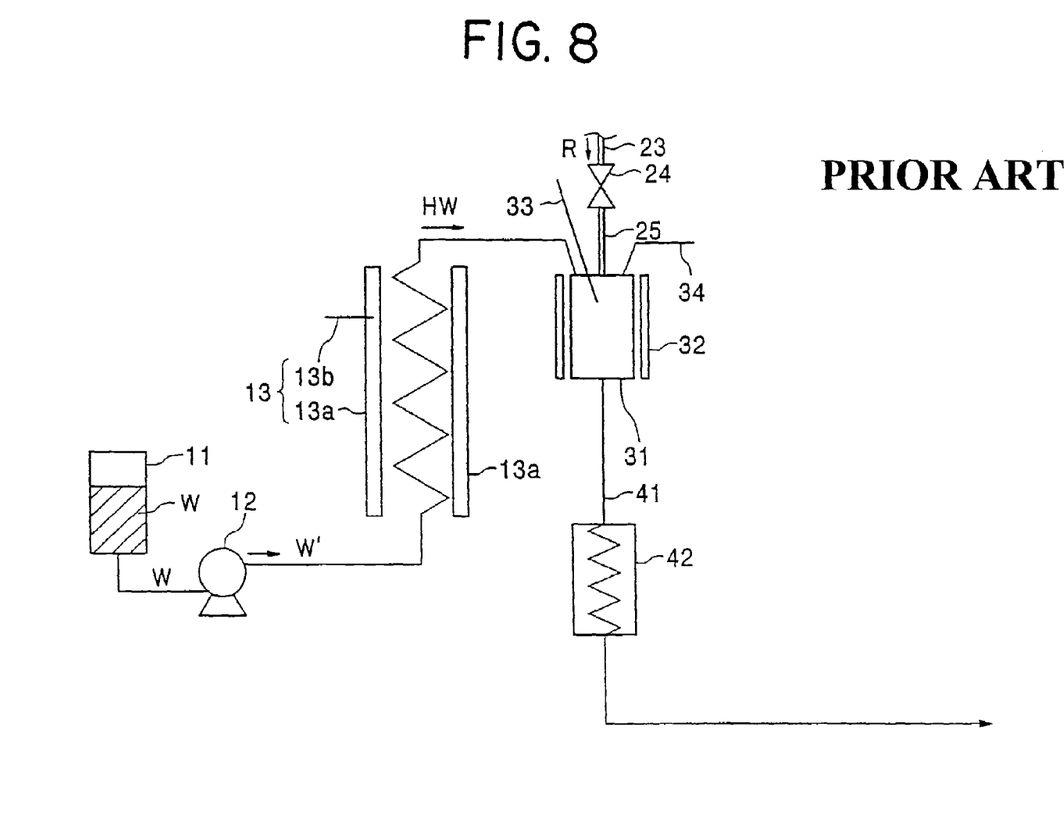
FIG. 8 is a schematic configuration diagram of a reactor according to a conventional example.

As an apparatus capable of preventing a reactant from a temperature condition that is not the target temperature, or introducing the reactant into hot water for just an instant even if it is not the target temperature, a rapid injection type reactor illustrated in FIG. 8 is known. This reactor is mainly applied to reactants R that are solids to a certain degree.

The reactor illustrated in FIG. 8, as a supply system of hot water, it comprises a tank 11 that stores normal temperature and normal pressure water W for use, a pump 12 that delivers the water W from the tank 11 and raises the pressure until the target high pressure, a heater 13a disposed in the periphery of a pipe to heat the high pressure water W' inside the pipe, and a pre-heater 13 provided with a temperature sensor 13b for measuring the temperature of the heater 13a.

As a supply system of the reactant R, it comprises a standby chamber 23 for temporarily holding the reactant R, a valve 24, and a pipe 25.

As a reaction system of the reactant R, it comprises a reacting vessel 31 for performing a predetermined reaction treatment to the reactant R, a heater 32 disposed in the periphery of the reacting vessel 31 to heat the reacting vessel 31 to a predetermined temperature, a temperature sensor 33 for measuring the temperature inside the reacting vessel 31, and a pressure sensor 34 for measuring the pressure inside the reacting vessel 31.

As an exhaust system, it comprises a pipe 41 connected to the bottom of the reacting vessel 31 and a cooler 42 configured so that coolant supplied from an unillustrated coolant circulatory device circulates to the periphery of the pipe 41, and cools the hot water HW to about room temperature.

In the above reactor, all the pipes including the pipes 25 and 41, the standby chamber 23, and the reacting vessel 31 are filled with water.

Further, each of the pipes and the reacting vessel 31 are formed of a material having a quality that can withstand high temperature and high pressure, such as SUS316, Inconel or Hastelloy.

A reaction treatment of a reactant R by the above reactor will be explained.

First, the normal temperature and normal pressure water W extracted from the tank 11 is pressurized at the pump 12 to thereby become a high pressure water W' of high pressure and the high pressure water W' is continuously fed to the pre-heater 13. The high pressure water W' in the pipe is heated by the pre-heater 13 to a predetermined temperature where it becomes hot water HW and fed into the reacting vessel 31 and discharged from the reacting vessel 31 to the pipe 41. The hot water is cooled to a temperature of about room temperature by the cooler 42 and discharged to the outside of the apparatus.

Here the inside of the reacting vessel 31 is heated to a predetermined temperature by the heater 32.

Under the above states the reactant R held in the standby chamber 23 falls into the reacting vessel 31 via the pipe 25 by opening the valve 24, and reaction treatment such as oxidative decomposition is performed on the reactant R by the hot water HW in the reacting vessel 31. The reaction product and a reactant R not reacted are discharged with the hot water HW via the pipe 41 and after being cooled by the cooler 42 to a temperature of about room temperature, they are discharged to the outside of the apparatus.

Here, since the reactant R temporarily remains in the standby chamber 23, the standby chamber 23 needs to be made about room temperature.

To maintain the temperature from the valve 24 to the upper portion close to room temperature, the pipe 25 must have the function to cut off the high temperature at the reacting vessel 31 in addition to having the function of letting the reactant R pass through. Therefore, making the pipe 25 to a certain length so that it may cool off naturally is conceivable.

However, if the pipe 25 is made long, it will take time for the reactant R to fall and during that time the reactant R will be subjected to hot water of a temperature lower than the target reaction temperature, and thus is not preferable.

Therefore, without making the pipe 25 too long, but instead it is conceivable to provide an unillustrated fin for air cooling around the pipe 25 and to circulate an unillustrated coolant. The length of the pipe 25 and an unillustrated cooling mechanism thereof were designed taking into consideration these thermal conduction.

On the other hand, the reactant R introduced into the reacting vessel 31 decomposes and diffuses, and a portion thereof reaches the pipe 25 also. That is, when a pipe of the above length and the unillustrated cooling mechanism thereof are designed, the reactant R will also be exposed to a temperature that is considerably lower than the target temperature.

Because the cooling mechanism is designed so that the temperature nearby the valve 24 side of the pipe 25 is considerably lower than the temperature of the reacting vessel 31, the temperature will be close to room temperature.

This is, from the aim of the apparatus, although not quite preferable, it is deemed that the influences thereof are of a level that can be ignored.

However, the temperature of the valve 24 and that of the standby chamber became a temperature considerably exceeding a design expectation value when the apparatus was actually put in operation. The reason for this resides in the occurrence of a convection current of the water in the pipe 25 which was not assumed.

Figure 9:
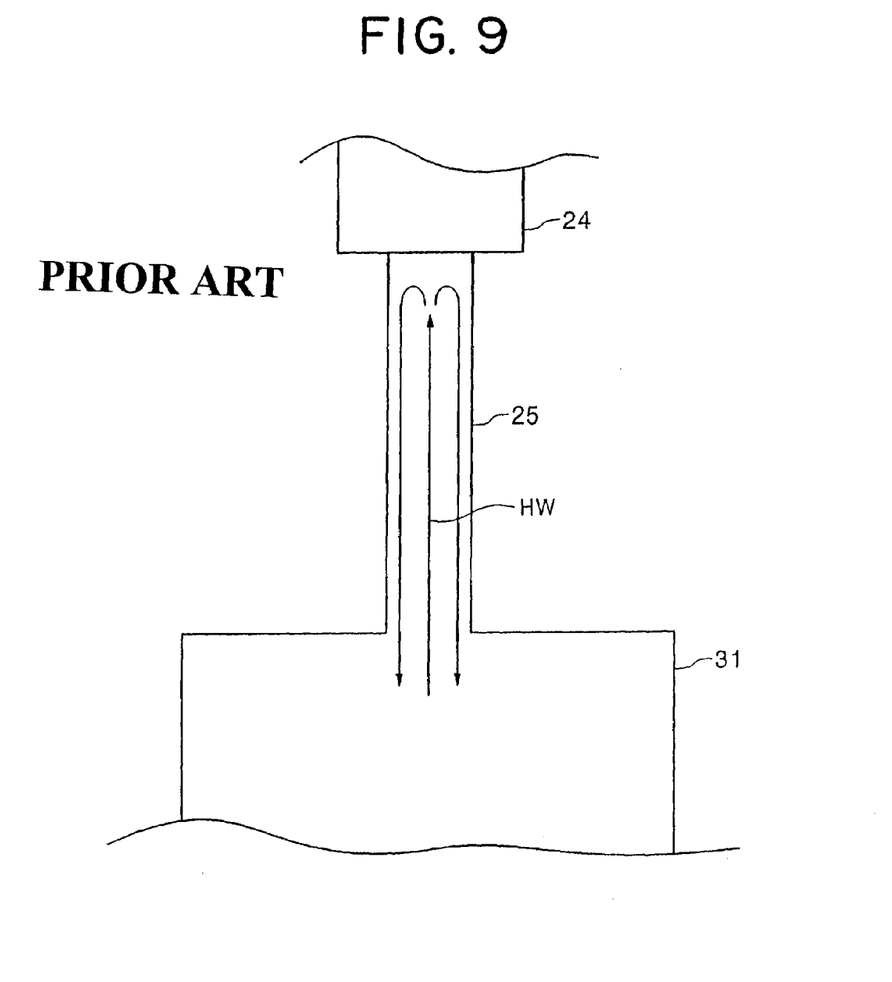
FIG. 9 is a diagram for explaining the problems of the reactor according to the conventional example.

This situation is shown with reference to FIG. 9. The high temperature and high pressure water HW inside the reacting vessel maintained at that temperature had reached the valve 24 or near the valve 24.

That is, the temperature of the hot water HW inside the reacting vessel is higher than that of the water in the pipe 25, so the density of this part of the hot water HW becomes smaller due to swelling and rises due to buoyancy, and the water inside the pipe 25 flows into the reacting vessel in place of this hot water HW to generate a circulating flow in the pipe 25.

Due to this convection flow, the valve 24 is overheat, thus a problem of receiving thermal damages occurred. Presently, there is not valve usable under the above high temperature and high pressure condition, and therefore to prevent damages to the valve, a method of strengthening the cooling at the pipe 25 is conceivable, however, there is a limit to air cooling, etc., so the length of the pipe 25 is made extremely long to cope with this problem.

As described above, the reactant R passing through the pipe 25 needs a more longer time, and this is not preferable from the aim of the apparatus. That is, exposing the reactant R to a temperature that is lower than the target temperature and damages to the apparatus is a trade-off.

Further, the convection current at the pipe 25 also carries the reactant R which has dispersed (dissolved) in the water introduced into the reacting vessel to the upper portion of the pipe 25. That is to say, the reactant R is exposed to a temperature that is considerably lower than a target reaction temperature.

This becomes a major problem compared with the above problem caused by diffusion and the problem caused by the time subjecting the reactant R to a temperature that is not the target temperature at the pipe 25 when the reactant R is fed thereto.

As explained above, the conventional apparatus illustrated in FIG. 8 is not capable of making the reactant R react at a target temperature.

SUMMARY OF THE INVENTION

An object of the present invention is to provide a reactor capable of making a reactant react at a target temperature as much as possible.

To achieve the above object, the reactor of the present invention comprises a reaction unit that contains a fluid including high temperature and high pressure water under target reaction temperature and reaction pressure condition, said reaction unit performing a reaction treatment to a reactant by the fluid; a first pipe portion connected to the reaction unit, through which the reactant is supplied to the reaction unit; and a first partition means for partitioning between the first pipe portion and the reaction unit so as to prevent leakage of any one of the fluid, the reactant, and a reaction product from the reaction unit side to the first pipe portion side.

Further, to achieve the above object, the reactor of the present invention comprises a reaction unit that contains a fluid including high temperature and high pressure water under target reaction temperature and reaction pressure condition, said reaction unit performing a reaction treatment to a reactant by the fluid; a first pipe portion connected to the reaction unit, through which the reactant is supplied to the reaction unit; and a reverse means for reversing a relative position of the first pipe portion with respect to the reaction unit upside down so as to prevent leakage of any of the fluid, the reactant, and a reaction product from the reaction unit side to the first pipe portion side.

Still further, to achieve the above object, the reactor of the present invention comprises a reaction that contains a fluid including high temperature and high pressure water under target reaction temperature and reaction pressure condition, said reaction unit performing a reaction treatment to a reactant by the fluid and a first pipe portion connected to the bottom part of the reaction unit, through which the reactant is supplied to the reaction unit.

DETAILED DESCRIPTION OF THE PRESENTLY PREFERRED EMBODIMENTS

Hereinafter, embodiments of the present invention will be described with reference to the drawings.

First Embodiment

Figure 1:
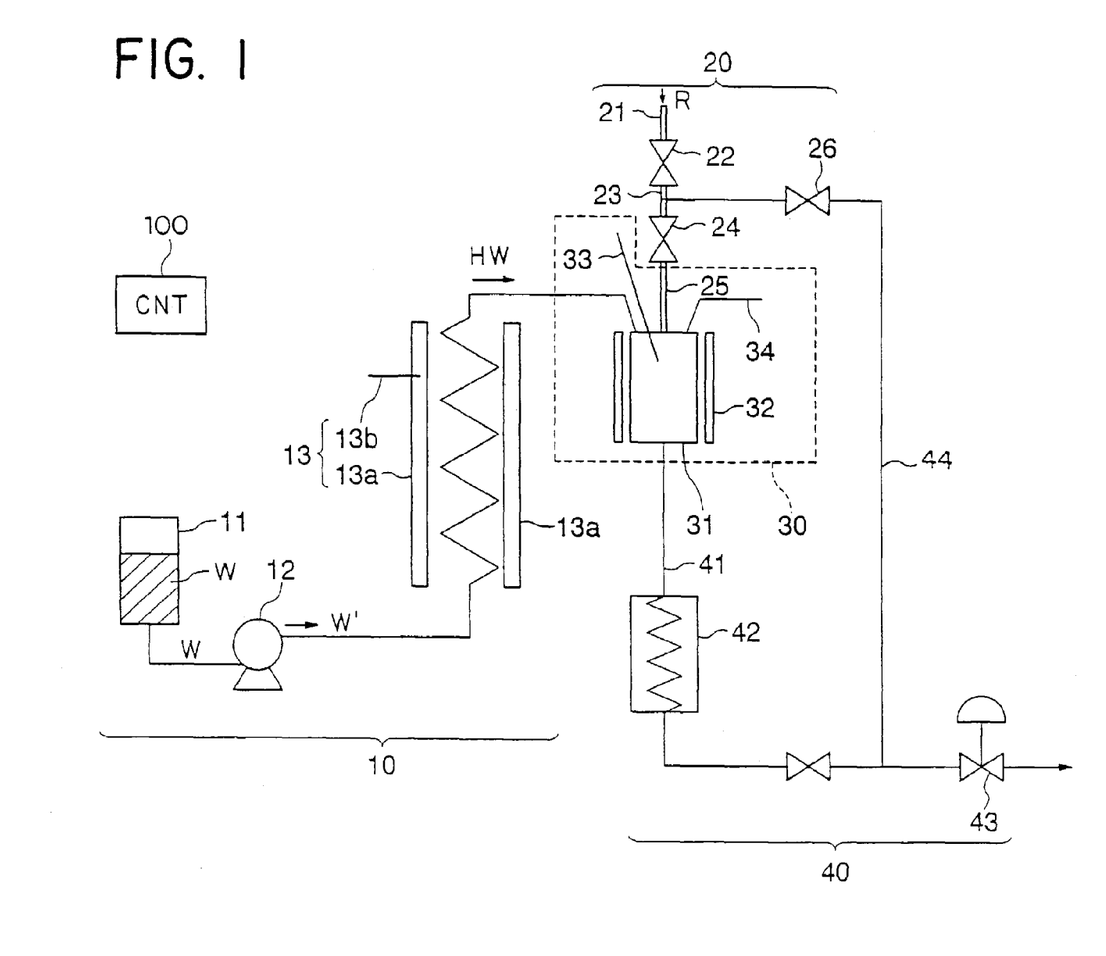
FIG. 1 is a schematic configuration diagram of a reactor according to a first embodiment.

FIG. 1 is a schematic configuration diagram of a reactor according to a first embodiment. The reactor illustrated in FIG. 1 roughly comprises a hot water supply system 10, a reactant supply system 20, a reactant reaction system 30, and an exhaust system 40.

Note that in the present specification the meaning of the term "hot water" includes both supercritical water and near-critical water.

As the hot water supply system 10, it comprises a tank 11, a pump 12, and a pre-heater 13.

The tank 11 stores normal temperature and normal pressure water W to be used.

The pump 12 delivers the water W from the tank 11 and pressurizes the water W to a target high pressure.

Note that a control unit (CNT) 100 is connected to the pump 12, and the control unit 100 receives a detect pressure signal by a pressure sensor 34 which will be explained later, to control the flow rate of the high pressure water W' delivered from the pump 12 so that it is near a set pressure.

The pre-heater 13 is one having a heater 13a disposed in the periphery of a pipe, and heats the high pressure water W' flowing in the pipe to about the target temperature. A temperature sensor 13b is provided in the heater 13a of the pre-heater 13, the control unit 100 is connected to the temperature sensor 13b and receives a detect temperature signal by the temperature sensor 13b to control the temperature of the heater 13a so that it is near a set temperature.

The reactant supply system 20 is one for supplying a reactant R to the reaction system 30 and comprises from the top, a feeding inlet 21, a valve 22, a standby chamber 23, a valve 24, a reactant introducing pipe 25, and further a valve 26 connected to the standby chamber 23.

An upper part of the feeding inlet 21 is communicated with the outside atmosphere of the reactor, the reactant R as the target for reaction is fed into the feeding inlet 21, and the fed reactant R is retained at an upper end of the valve 22.

By opening the valve 22, the reactant R introduced from the feeding inlet 21 is retained at an upper end of the valve 24, whereby it is made to stay temporarily in the standby chamber 23.

The reactant R in the standby chamber 23 is introduced into the reaction system 30 by opening the valve 24.

The pipe 25 is connected to the reaction system 30, and guides the reactant R introduced from the standby chamber 23 by opening the valve 24 to a reacting vessel.

The valve 26, which will be explained later, is provided for adjusting the pressure of the exhaust system 40 and that of the standby chamber 23 so that they will be of the same level by opening the valve 26.

From the feeding inlet 21 to the reaction system 30, the valves 22 and 24, the standby chamber 23, and the pipe 25 in connection therebetween have adequate shapes and sizes for the reactant R to pass through.

For example, for the passage of the reactant R, the valves 22 and 24 are composed of a borethrough type valve which requires a certain size and a shape.

Note that since the differential pressure of both ends of the three valves 22, 24, and 26 becomes a difference between the high pressure due to the high temperature and the high pressure hot water HW inside the apparatus, and the atmospheric pressure, that is, outside air, thus the three valves are formed of a material and thickness capable of at least withstanding the pressure difference. Such material will be described later.

The reactant R drops to the reaction system 30 at its own weight if the specific gravity (relative density) thereof is greater than that of the hot water HW which will be explained later. It should be noted that the density of the hot water HW supplied to the reaction system 30 is often less than that of the water W of normal temperature and normal pressure.

A reactant R having a specific gravity that is less than that of the hot water HW is placed in a capsule and then introduced into the reaction system. For example, a hollow cylindrical shape capsule made of metal and the side surface thereof has either mesh or a plurality of small open holes can be used.

In this case, due to gravitation, the metallic capsule including the reactant R from the standby chamber 23 of about room temperature falls into the reaction system 30 which is being heated to a target temperature, thereby making it possible to perform rapid introduction of the reactant.

When the reactant R is a fluid, by placing the reactant in a holder by some sort of method, it can be dropped into the reaction system. Specifically, for example, the fluid reactant R is placed in a resinous bag and enclosed therein by a heat seal. If the specific gravity of the holder is lighter than that of the hot water HW and free dropping thereof is difficult, then it is good to use the aforementioned capsule.

At this point, the quality of the material of the capsule or the holder is set so that a target reaction of the reactant R will not be changed by the holder or the capsule. Of course, compared with the quantity of the reactant R, it goes without saying that it is good to make the quantity of the holder or the capsule lesser (make the thickness thin).

Further, when the reactant R is gas, similarly with the fluid, enclose the gas reactant into a holder or the like, and it can be introduced into a reacting vessel.

The reaction system 30 of the reactant R comprises the reacting vessel, a heater 32, a temperature sensor 33, and a pressure sensor 34.

In the reacting vessel, the high temperature and high pressure hot water HW is continuously introduced thereto passing through the pre-heater 13, and the reactant R is introduced thereto from the pipe 25 during reaction treatment. Due to this, predetermined reaction treatment of oxidative decomposition, hydrolysis, etc. is performed on the reactant R by the hot water HW.

Figure 2:
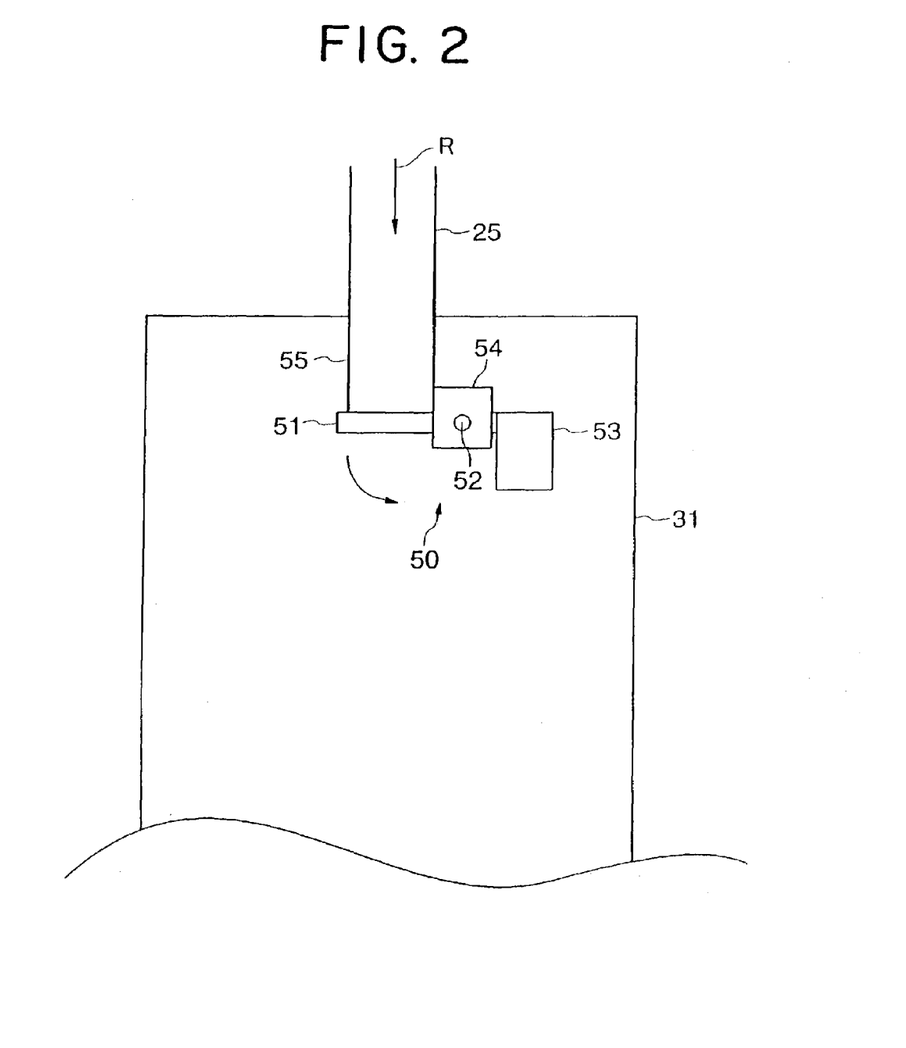
FIG. 2 is an enlarged sectional diagram of the reacting vessel shown in FIG. 1.

FIG. 2 illustrates an enlarged sectional diagram of the reacting vessel according to the first embodiment. Note that in FIG.2, only the principle components of the upper part of the reacting vessel is shown and the illustration of the temperature sensor 33 and other parts are omitted.

In the reactor according to the first embodiment, a partition means 50 is provided inside the reacting vessel.

The partition means 50 is composed of a valve 51, a shaft 52, a weight 53, a supporting member 54, and a pipe 55.

The valve 51 is supported by the shaft 52, and the weight 53 is provided on the opposite side of the valve 51 with the shaft 52 sandwiched therebetween. With the shaft 52 as the center of rotation, the valve 51 is rotatable in the direction of the arrow in the diagram.

The shaft 52 is supported by the supporting member 54 and the supporting member 54 is fixed to the pipe 55.

The weight 53 has a weight like closing the valve 24 normally and a weight like opening the valve 24 by the weight of the reactant R delivered therein.

The pipe 55 is fixed to an inner wall of the reacting vessel by an unillustrated supporting member.

As the material to form each of the components 51 to 55 composing the above partition means 50, materials such as SUS316 and Inconel can be used.

An operation of the above-mentioned partition means 50 will be explained.

Normally, due to the weight 53, the valve 51 covers the opening of a bottom end of the pipe 55 as shown in FIG. 2. That is, it isolates the pipe 55 and the inside of the reacting vessel. At this time, although the valve 51 does not completely seal up the inside of the reacting vessel, it has the ability to prevent a large amount of hot water HW in the reacting vessel from leaking into the pipe 25 due to its convection current.

Then, when the reactant R or the reactant R stored in the capsule starts to drop passing through the pipe 25, the reactant R pushes open the valve 51 in the direction of the arrow by the weight thereof and passes through.

After the passing of the reactant R, the valve 51 returns again to the state shown in FIG. 2 due to the weight 53.

Note that although it is conceivable that a convection current is occurring in the lower part of the high temperature and the upper part of the low temperature inside the pipe 25, the reacting vessel is isolated from the pipe 25 by the valve 51, and therefore the reactant R introduced into the reacting vessel entering into the pipe 25 becomes an amount that can be almost all ignored.

The heater 32 is provided in the periphery of the reacting vessel and heats the reacting vessel 31 to a predetermined temperature. Further, the temperature sensor 33 measures the temperature inside the reacting vessel 31.

The control unit 100 is connected to the temperature sensor 33 and receives a detect temperature signal by the temperature sensor to thereby control the temperature of the heater 32 so that it is close to a set temperature The pressure sensor 34 measures the pressure inside the reacting vessel 31.

The control unit 100 is connected to the pressure sensor 34 and receives a detect pressure signal by the pressure sensor 34 to thereby control the pump 12 so as to control the amount of flowing of the high pressure water W' delivered from the pump 12 so that it is close to a set pressure.

The exhaust system 40 is comprised of a pipe 41 connected below the reacting vessel 31, a cooler 42, and a pressure holding valve 43, etc.

The cooler 42 is configured so that coolant, for example cooling water, supplied from an unillustrated coolant circulatory device circulates the periphery of the pipe 41, and cools the hot water HW discharged from the reacting vessel 31 until about room temperature.

The pressure holding valve 43 is one for keeping the pressure inside the pipe and a pipe branches at this side thereof. When the pressure inside the pipe exceeds a target pressure, water passing through the cooler 42 is discharged to the outside passing the pressure holding valve 43.

Note that the main stream of the water passing through the cooler 42 is usually discharged via the pressure holding valve 43.

The other pipe 44 that branched off in this side of the pressure holding valve 43 is connected to the standby chamber 23 passing the valve 26. Note that the pipe 44 is only for the purpose of conveying the high pressure, therefore, although the inside of the pipe 44 is filled with water, basically there is no flow of water.

In the above reactor, all the pipes, the standby chamber 23, and the inside of the reacting vessel 31 are filled with water.

Also, each of the pipes and the reacting vessel 31 are formed of a material having a quality that can withstand high temperature and high pressure, for example SUS316.

Note that the part where the temperature does not become high, for example the pipe from the pump 12 to the pre-heater 13 may be a pressure-resistant material or structure (thick), and the part that does not become high temperature or high pressure, for example the pipe from the tank 11 to the pump 12 need not be pressure-resistant.

Corrosive materials such as acid and alkali are included in the reactant R, when products of reaction of corrosive nature are produced due to the reaction, or when some kind of material having a corrosive nature is added in advance to the water for use, then the quality of the material for every pipe and the like must be superior in corrosion-resistant. Therefore, in such case, Inconel, Hastelloy, and the like are used as the material of each of the pipes and the like.

An operation of the reactor according to the above first embodiment will be explained.

First, the normal temperature and normal pressure water W introduced from the tank 11 is pressurized at the pump 12 and the high pressure water W' is supplied to the pre-heater 13. The high pressure water W' in the pipe is heated by the pre-heater 13 to a predetermined high temperature to thereby become hot water HW of high temperature and high pressure and supplied into the reacting vessel 31. The hot water HW is discharged from the reacting vessel 31 to the pipe 41, cooled to a temperature of about room temperature by the cooler 42 and discharged to the outside of the apparatus.

Here, inside the reacting vessel 31, it is set to a predetermined temperature by the heater 32.

The supplying of a reactant into the reacting vessel 31 is performed under the above state.

Details of the operation of the reactant supply system 20 will be explained with references to FIGS. 3A to 3D.

Figure 3A:
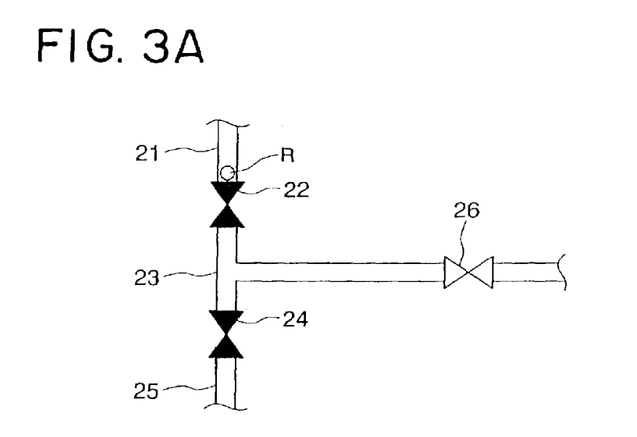
FIGS. 3A to 3D are diagrams for explaining details of an operation of a supply system of a reactant.

As shown in FIG. 3A, the open-close state of the valves 22, 24, and 26 before the introduction of the reactant R is that the valves 22 and 24 are closed while the valve 26 is opened. Then, the reactant R is introduced into the feeding inlet 21. Note that there are cases where the reactant R is stored in a capsule or the like.

Figure 3B:
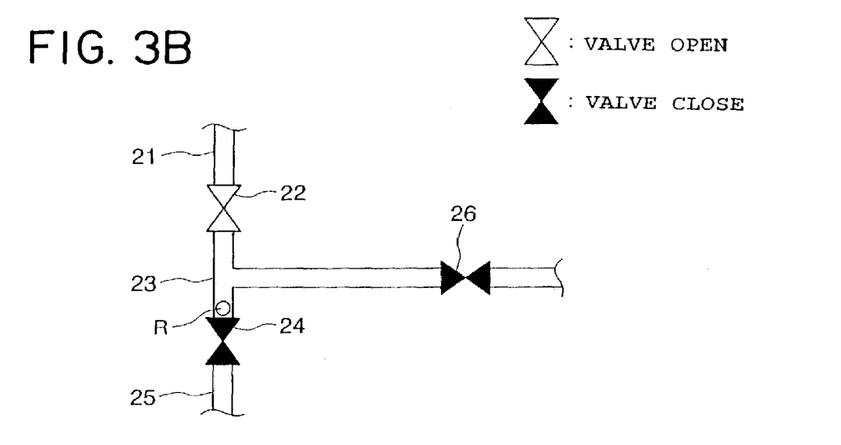

Then as shown in FIG. 3B, in order to introduce the reactant R into the standby chamber 23, by closing the valve 26 and opening the valve 22, the reactant R is introduced from the feeding inlet 21 to the standby chamber 23, and the reactant R is stays in the standby chamber 23.

Figure 3C:
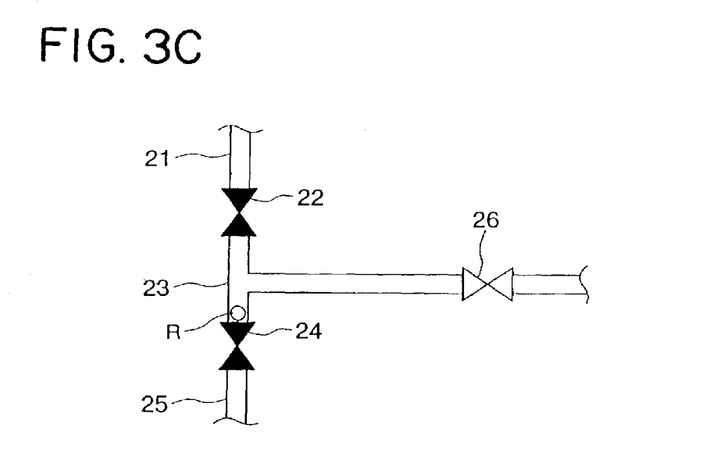

Next, as shown in FIG. 3C, by closing the valve 22 and opening the valve 26, the pressure of the standby chamber 12 is raised to a high pressure so that it is equivalent to the pressure of the reacting vessel 31.

Figure 3D:
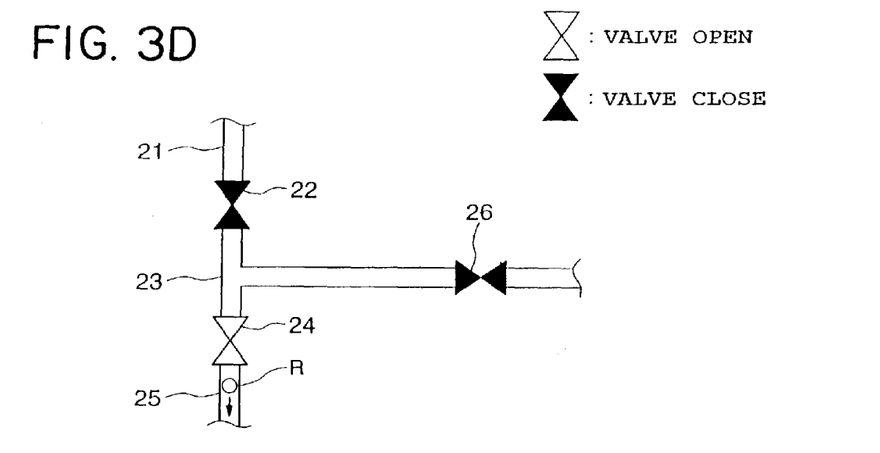

Next, as shown in FIG. 3D, by closing the valve 26 and opening the valve 24, the reactant R falls into the reacting vessel 31 passing through the pipe 25.

After the introduction of the reactant R into the reacting vessel 31, again as shown in FIG. 3A, the valve 24 is closed and the valve 26 is opened.

As shown in FIG. 2, when the reactant R falls passing through the pipe 25, the reactant R pushes open the valve 51 in the direction of the arrow, and passes through.

After the reactant R has passed through, the valve 51 again returns to the state shown in FIG. 2 due to the weight 53.

Then, under the state where the hot water HW is continuously supplied into the reacting vessel 31, the reactant R rapidly introduced into the reacting vessel 31 is treated to a reaction treatment of oxidative decomposition or the like by the hot water HW inside the reacting vessel 31.

Thereafter, the reaction product and the reactant R not reacted, together with the hot water HW, are discharged from the inside of the reacting vessel 31 to the pipe 41, and after being cooled to a temperature of about room temperature by the cooler 42, they are discharged to the outside of the reactor.

Note that in the above example, an example of ceaselessly sending the hot water HW was explained, however, if the hot water HW is ceaselessly sent, there may be a case where the reactant R only dissolves or disperses in the hot water and then discharged from the reacting vessel 31 before the reaction thereof has sufficiently progressed.

In such a case, the amount of hot water HW to be sent can also be reduced to make the staying time of the reactant R longer in the reacting vessel 31 so that the reaction thereof progresses sufficiently.

Or, after the introduction of the reactant R, the sending of the hot water HW is stopped, and this situation is maintained as it is for a certain time, and thereafter, hot water HW is sent and discharged.

Since the cause of the aforementioned problem is mainly the convection current of water, the first embodiment is provided from the viewpoint of preventing the convection current. That is, a partition means 50 is newly provided at the vicinity of the connection part of the reacting vessel 31 and the pipe 25. Note that although the usage of a normal valve as the partition means 50 is also conceivable, in the so-called normal valve capable of cut off and withstanding a differential pressure of both ends, under the using condition of this case, there is none in today's technology that can withstand high temperature and high pressure water of for example about 400° C. and 25 MPa.

Therefore, in this case, the cut off of the pressure is ignored, the cutting off of the pressure is given to the valve 24. The newly provided valve 51 is provided from the viewpoint to cut off the passage of the hot water HW and the reactant R that dispersing and dissolving or to prevent the passage thereof.

Although providing the partition means 50 just right at the connecting surface of the reacting vessel 31 and the pipe 25 connected thereto is ideal, the partition means 50 is positioned either at the outside or inside of the reacting vessel because the mechanism of the partition means 50 itself requires a size of some extent.

It should be noted that compared with providing the partition means 50 at the outside, providing it at the inside of the reacting vessel 31 as explained in the first embodiment can further enhance the uniformity of the temperature condition inside the reacting vessel 31.

Therefore, in the reactor according to the first embodiment, by isolating the pipe 25 for supplying the reactant and the reacting vessel 31 by the partition means 50, the reactant R introduced into the reacting vessel 31 can be prevented from entering into the pipe 25.

Due to this, reaction treatment of the reactant R can be conducted only inside the reacting vessel 31, and as a result, the condition of the reaction temperature can be maintained at a uniform temperature.

Further, since the hot water HW inside the reacting vessel 31 does not directly enter into the pipe 25, compared with the apparatus illustrated in FIG. 8 without the valve 51, the transmission of heat to the pipe 25 can be considerably suppressed.

Therefore, even if a convection current occurs inside the pipe 25, the valve 24 above the pipe 25 can be prevented from overheating.

Second Embodiment

Although the problem caused by thermal convection current can be solved in the first embodiment, at this point, the reactant R and the reaction product inside the reacting vessel 31 have also diffused to each of the various pipes connected to the reacting vessel 31. In the case of stopping the sending of hot water HW into the reacting vessel 31 after introducing the reactant R, since there is enough time for diffusion, there is a case where a problem due to diffusion will clearly exist.

Note that the term "diffusion" herein, other than meaning diffusion cause by density distribution, also includes the meaning of thermal diffusion cause by temperature distribution.

Figure 4:
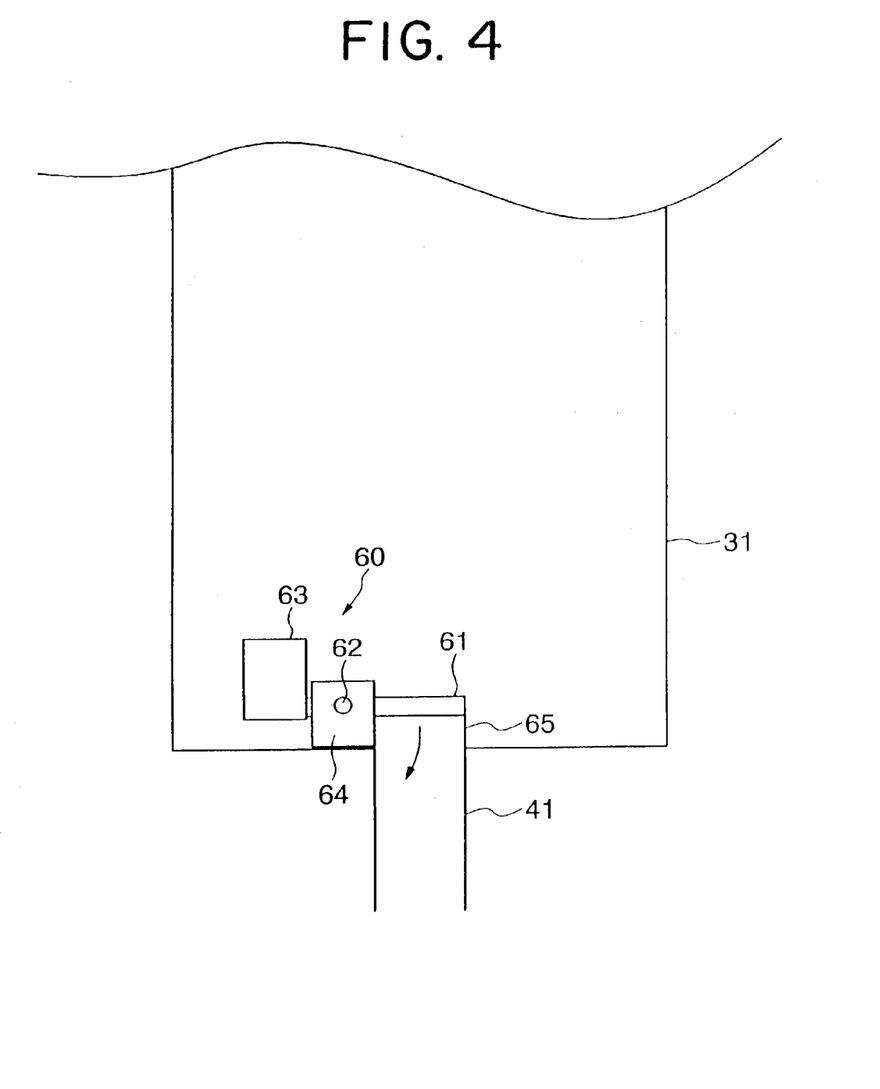
FIG. 4 is an enlarged sectional diagram of a reacting vessel in a reactor according to a second embodiment.

Therefore, in a reactor according to the second embodiment, although the apparatus configuration is basically the same as that of the first embodiment, the following configuration is added to the reacting vessel 31. Note that for simplification, in the reactor according to the second embodiment, only the components different from those of the first embodiment will be described.

An enlarged sectional diagram of the reacting vessel 31 according to the second embodiment is shown in FIG. 4. Note that in FIG. 4, only the main components of a bottom part of the reacting vessel 31 are shown, and the illustration of the temperature sensor 33 and the like are omitted.

Although the partition means 50 is provided between the pipe 25 of the reactant supply system 20 and the reacting vessel 31 in the reactor according to the first embodiment, in the reactor according to the second embodiment, a similar partition means 60 is further provided between the pipe 41 of the exhaust system 40 and the reacting vessel 31.

The partition means 60, similar to the first embodiment, is composed of a valve 61, a shaft 62, a weight 63, a supporting member 64, and a pipe 65.

The valve 61 is supported by the shaft 62, and the weight 63 is provided on the opposite side of the valve 61 with the shaft 62 sandwiched therebetween. With the shaft 62 as the center of rotation, the valve 61 is rotatable in the direction of the arrow in the drawing.

The shaft 62 is supported by the supporting member 64 and the supporting member 64 is fixed to the pipe 65.

The weight 63 has a weight like closing the valve 61 normally and a weight like opening the valve 61 by the weight of predetermined drainage.

The pipe 65 is fixed to an inner wall of the reacting vessel 31 by an unillustrated supporting member.

As the material of each of the above components 61 to 65, materials such as SUS316 and Inconel can be used.

An operation of the above-mentioned partition means 60 will be explained.

Normally, the valve 61 is in the state as shown in FIG. 4 due to the weight 63. That is, it isolates the pipe 41 and the inside of the reacting vessel 31. At this time, although the valve 61 does not completely seal up the inside of the reacting vessel 31, it has the ability to prevent a large amount of hot water HW in the reacting vessel 31 from leaking into the pipe 41 due to diffusion.

Then, when the reaction product, the reactant R not reacted, and the hot water HW (hereinafter referred to as "drainage") on the valve 61 reach a predetermined weight, the drainage pushes open the valve 61 in the direction of the arrow, and the drainage is introduced into the pipe 41 and discharged.

After the drainage has passed through, the valve 61 returns again to the state shown in FIG. 4 due to the weight 63.

According to the reactor according to the second embodiment, in addition to the effect of the first embodiment, the reacting vessel 31 and the pipe 41 are isolated by the valve 61, and therefore even if it is a case of having enough time to diffuse to the outside of the reacting vessel 31 such as in the case of stopping the sending of hot water HW into the reacting vessel 31 after the introduction of the reactant R, the diffusion of the reactant R and the reaction product inside the reacting vessel 31 to the pipe 41 can be prevented.

Consequently, even in such a case, reaction treatment of the reactant R can be conducted only inside the reacting vessel 31, and as a result, the condition of the reaction temperature can be maintained at a uniform temperature.

Third Embodiment

Figure 5:
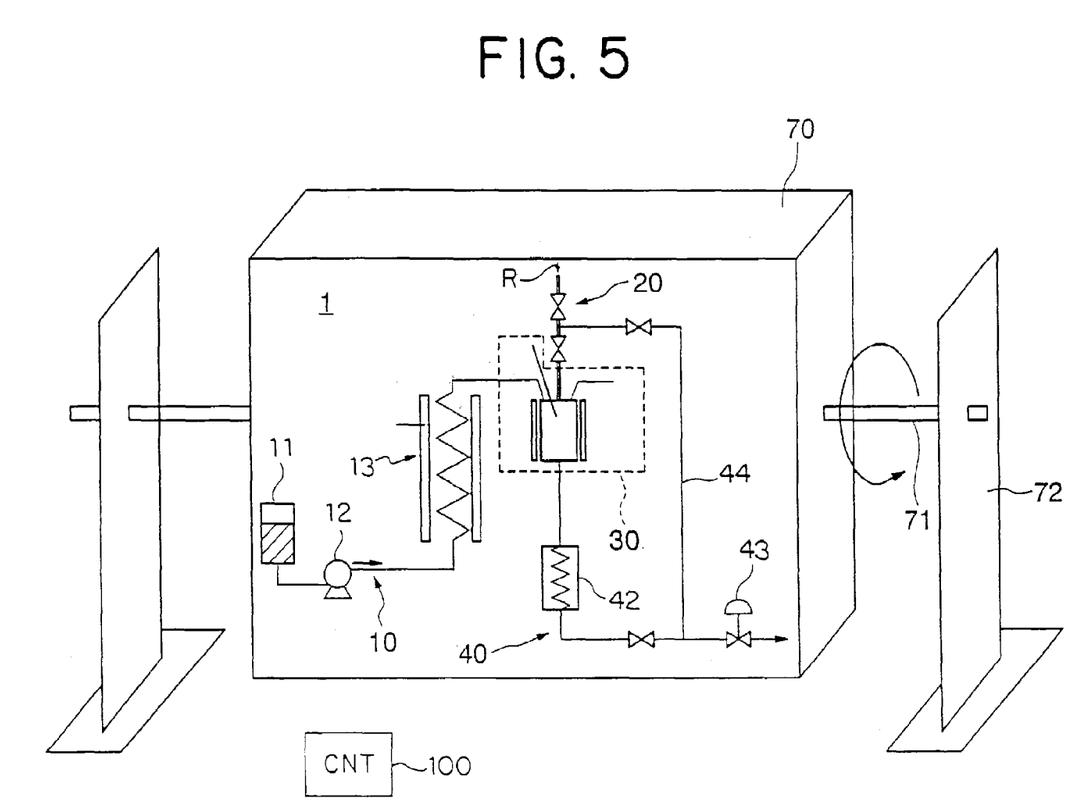
FIG. 5 is a schematic configuration diagram of a reactor according to a third embodiment.

In a reactor according to the third embodiment, from the fact that the reacting vessel 31 which will become high temperature is at the lower part while the reactant introducing pipe 25 which will become low temperature is at the upper part, attention is directed to the occurrence of a convection current, thus the location of the reacting vessel 31 and the pipe 25 are reversed so that a convection current will not be generated.

Therefore, in the reactor according to the third embodiment, the main parts thereof are basically the same as the apparatus illustrated in FIG. 8 or the apparatus of the first embodiment and the following components have been added. Note that for the sake of simplifying the explanation, in the reactor according to the third embodiment, only the components different from those of the first embodiment are explained.

A schematic configuration diagram of the reactor according to the third embodiment is shown in FIG. 5.

The reactor shown in FIG. 5 comprises a cabinet 70 for accommodating a main body portion 1 of the reactor in the first embodiment shown in FIG. 1 or the apparatus illustrated in FIG. 8, and a shaft 71 is connected to both sides of the cabinet 70 and the shaft 71 is supported by a supporting member 72.

The cabinet 70 for accommodating the main body portion 1 of the reactor is rotatable in the direction of the arrow of FIG. 5 by the shaft 71. Note that capable of making continuous rotation is not necessary, but good if able to make reciprocatory half turns. The rotation of the above shaft 71 may be performed manually, or an unillustrated mechanism to rotate by the power of a motor or the like may be provided.

Further, because the main body portion 1 of the reactor is made to rotate, the pipes, etc. for supplying a circulating coolant or the like from the outside to the main body portion 1 of the reactor are configured to be capable of relaxing the stress due to rotating the main body portion 1.

As an operation of the above reactor, normally, the main body portion 1 of the reactor is reversed by the shaft 71. That is, it is reversed so that the top and bottom directions are opposite the state shown in FIG. 5. Note that the top direction and the bottom direction herein are determined with respect to a gravitational direction.

Then, only at the time of introducing the reactant R, the top and bottom of the main body portion 1 of the reactor are reversed by the shaft 71 so that it is temporarily arranged as shown in FIG. 5.

Then, after arranging as shown in FIG. 5, by promptly performing the same operation as that of the first embodiment, the reactant R is introduced.

After the introduction of the reactant R, promptly reverse the top and bottom of the main body portion 1 of the reactor again.

According to the reactor of the third embodiment, normally, by reversing the top and bottom relation of the main body portion 1 of the reactor shown in FIG. 5, the reacting vessel 31 which will become high temperature is at the top part while the reactant R introducing pipe 25 which will become low temperature is at the bottom part, whereby a convection current of water can be prevented.

Note that because only at the time of introducing the reactant R it is arranged temporarily as shown in FIG. 5, although a convection current of water will occur, if it is a very short time, the influence thereof can be suppress to a level that can be ignored Fourth Embodiment A configuration diagram of a reactor according to a fourth embodiment is shown in FIG. 4. Note that the same reference symbols are denoted to the constituting members corresponding to those of the first embodiment. Note that for the sake of simplifying the explanation, in the reactor according to the fourth embodiment, only components different from those of the first embodiment will be explained.

Figure 6:
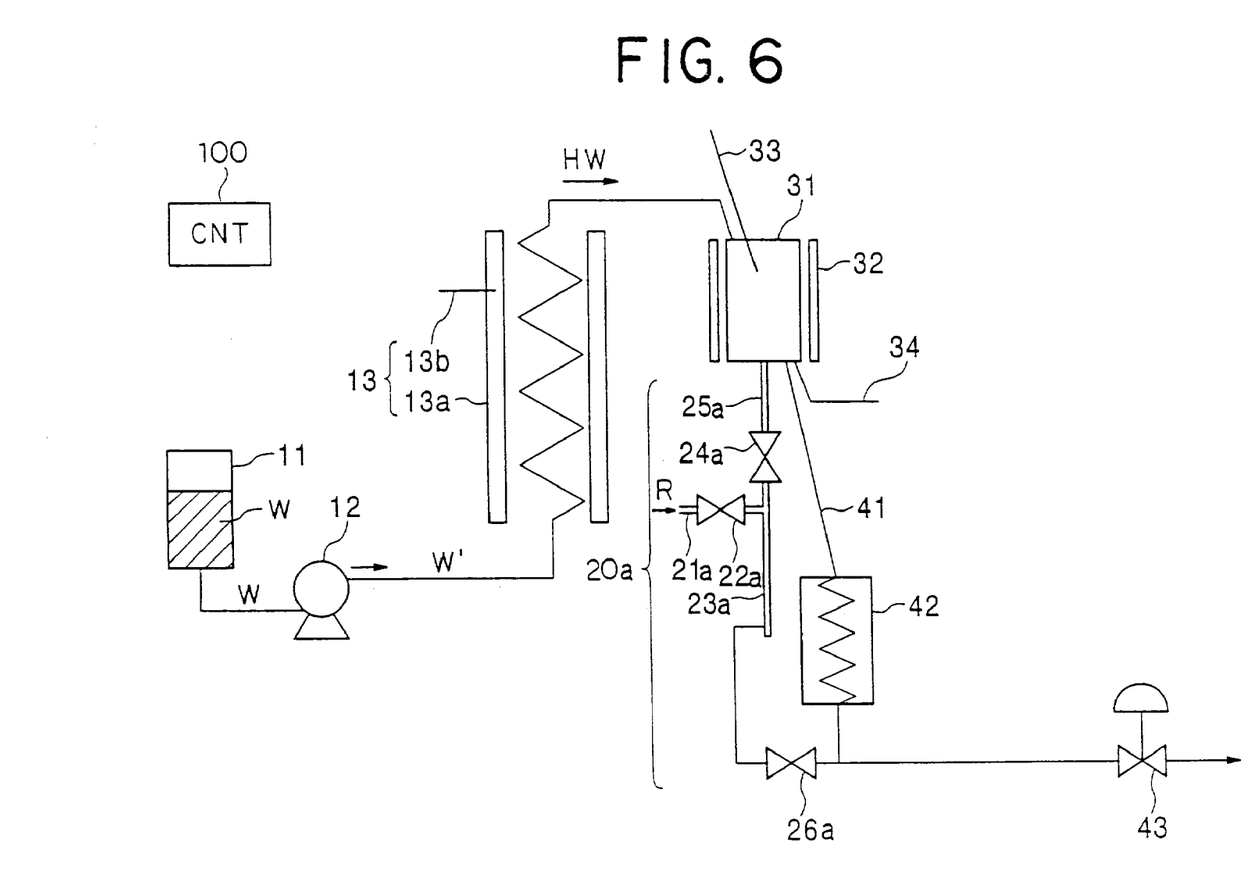
FIG. 6 is a schematic configuration diagram of a reactor according to a fourth embodiment.

In the reactor shown in FIG. 6, a reactant supply system 20a is connected to the bottom of the reacting vessel 31.

Namely, the reactant supply system 20a, below the reacting vessel 31, comprises a feeding inlet 21a, a valve 22a, a standby chamber 23a, a valve 24a, a reactant introducing pipe 25a, and further a valve 26a connected to the standby chamber 23a.

Note that similar with the first embodiment, the upper part of the feeding inlet 21a is communicated with the outside atmosphere of the reactor, and the reactant R to be reacted is inserted through the feeding inlet 21a which will be explained later.

By doing as such, the temperature of the pipe, etc. composing the reactant supply system 20a can be gradually reduced to lower than the temperature of the reacting vessel 31 as it is apart (downward direction) from the reacting vessel 31.

Although the pipe from the pre-heater 13 is connected at the top of the reacting vessel 31, this pipe also may be connected at other positions of the reacting vessel 31, for example, at the bottom thereof or side thereof.

Figure 7:
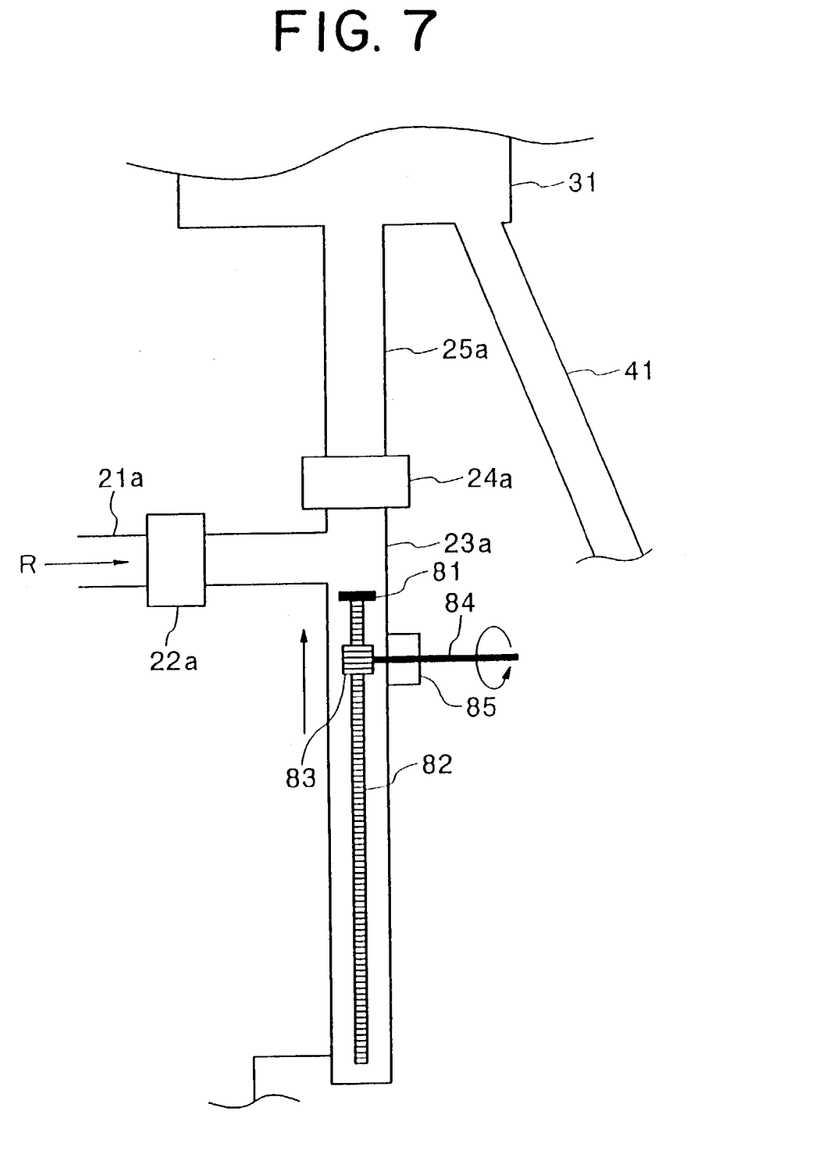
FIG. 7 is a diagram illustrating details of the vicinity of a standby chamber in the reactor according to the fourth embodiment.

Details of the vicinity of the standby chamber 23a are illustrated in FIG. 7.

Note that the temperature sensor 33 and the pressure sensor 34 or the like are omitted in FIG. 7.

Since the reactant supply system 20a is connected to the bottom part of the reacting vessel 31 in the fourth embodiment, a mechanism for making it possible to send the reactant R to the reacting vessel 31 from the bottom is provided. Note that it is assumed that the specific gravity of the reactant R at this point is large compared with the water inside the standby chamber 23.

In the fourth embodiment, as the reactant supply system 20a, it further comprises a platform 81, a feeding shaft 82, a gear 83, a rotation shaft 84, and a seal member 85.

The platform 81 is for placing the reactant R thereon.

The feeding shaft 82 is connected to the bottom of the platform 81 and takes a plate gear shape.

Therefore, the feeding shaft 82 and the gear 83 compose a rack-and-pinion, so the platform 81 together with the feeding shaft 82 are movable in the up and down direction.

The feeding shaft 82 has sufficient length for the platform 81 to enter into the inside of the reacting vessel 31.

Under the standby state of the reactant R as shown in FIG. 7, the standby chamber 23a has a shape and length capable of receiving the feeding shaft 82.

Also, the standby chamber 23a, via the valve 22a connected to a side surface thereof, is connected to the feeding inlet 21a.

Note that in FIG. 7 an example of a horizontal pipe connecting the valve 22a and the standby chamber 23a is shown. However, in order to facilitate the loading of the reactant R from the feeding inlet 21a to the standby chamber 23a, the pipe is inclined and the feeding inlet 21a is made to face in the upward direction. Due to this inclination, the reactant R can also be easily introduced into the standby chamber 23a.

The rotation shaft 84 is for conveying a rotation power from the outside of the standby chamber 23a to the inside thereof. The rotation shaft 84 enters the standby chamber 23a penetrating a seal member 85 from the outside. The rotation shaft 84 is connected to the gear 83 at the inside of the standby chamber 23a.

The seal member 85 is for preventing the pressure (high pressure) of the standby chamber 23a from leaking to the outside. The seal member 85 can be formed similar to a seal member of a valve fabricated by a conventional technology, and therefore a detail explanation of the structure thereof will be omitted.

The material of each of the above component members can be the same as that of the reactor of the first embodiment. For example, the platform 81 and the feeding shaft 82 enters the reacting vessel 31 and thus SUS316 and Inconel or the like are preferable.

Next, a method of introducing the reactant R into the reacting vessel 31 by the above reactant supply system 20a will be explained.

First, similar to the first embodiment, the reactant R is loaded into the standby chamber 23a.

However, in the fourth embodiment, the reactant R passes through the valve 22a connected to the side surface of the standby chamber 23a, so it is preferable that the reactant R is pushed to the platform 81 by using an unillustrated pole of some kind.

Note that as explained above, the pipe connecting the feeding inlet 21a and the standby chamber 23a is inclined and the feeding inlet 21a is made to face in the upward direction, so the reactant R may be introduced into the standby chamber 23a due to this inclination.

Subsequently, after opening the valve 24a, the rotation shaft 84 is turned to a suitable direction manually or by an unillustrated motor or the like of a drive device. Due to this, owing to the rotation thereof, the platform 81 together with the reactant R placed thereon are introduced into the reacting vessel 31 by the rack-and-pinion composed by the feeding shaft 82 and the gear 83.

At this point, it is preferable that the moving speed is as, fast as possible. This is because if the moving speed is slow, when the reactant R passes through the pipe 25a, the reactant R is subjected to a temperature lower than the target temperature for a longer time, thus is not preferable.

After the introduction of the reactant R, if the reactant R promptly dissolves and disperses in the hot water HW inside the reacting vessel 31, then the rotation shaft 84 is turned manually or by an unillustrated motor or the like of a drive device in a direction opposite the aforementioned direction, the platform 81 is returned to its original position, and the valve 24a is closed.

When the reactant R does not promptly dissolve and disperse in the hot water HW inside the reacting vessel 31, wait until it dissolves and disperses. Or, even if the platform 81 is returned to the bottom part from the reacting vessel 31, in the case of providing a mechanism so that the reactant R remains in the reacting vessel 31, then the platform 81 may be returned from the reacting vessel 31.

For example, in order to achieve this, providing an incline to the whole reacion apparatus 1 is conceivable.

The reactant R which has entered the reacting vessel 31 falls from the platform 81 due to this incline, for example in the drawing, the reactant is transferred to the lower right bottom part of the reacting vessel 31. By doing as such, right after sending the platform 81 into the reacting vessel 31, the platform 81 can be returned to its original position.

According to the reactor of the fourth embodiment, the pipe 25a for introducing the reactant R which has become low temperature is placed below the reacting vessel 31 which has become high temperature, due to introducing the reactant R from below, a convection current is suppressed and the reactant R introduced into the reacting vessel 31 can be suppressed from leaking to the pipe 25a.

Therefore, reaction treatment of the reactant R can be conducted inside the reacting vessel 31 only, and as a result, the condition of the reaction temperature can be maintained at a uniform temperature.

Further, the valve 24a at the bottom part of the reacting vessel 31 can be prevented from overheating due to a convection current.

The reactor of the present invention is not limited to the description of the above embodiments.

For example, an oxidizer or the like of oxygen and hydrogen peroxide, etc. may be added to the water. Also, various modifications may be made of the material for forming the pipes and the like, the introduction method of the reactant into the reacting vessel, and the number of valves to be used and the structures thereof.

Many variations may be made without departing from the scope of the present invention.

INDUSTRIAL APPLICABILITY

The reactor of the present invention is applicable to a reactor that performs reaction treatment to a reactant by using for example supercritical water or hot water under predetermined temperature and pressure condition.

The invention claimed is:

1. A reactor, comprising:
    a reaction unit that contains a fluid including high temperature and high pressure water under target reaction temperature and reaction pressure condition, said reaction unit performing a reaction treatment to a reactant by the fluid;
    a first pipe portion connected to said reaction unit, through which said reactant is supplied to said reaction unit;
    a first partition means for partitioning between said first pipe portion and said reaction unit so as to prevent leakage of any one of said fluid, said reactant, and a reaction product from said reaction unit side to said first pipe portion side;
    a second pipe portion connected to the bottom part of said reaction unit, through which said fluid, said reactant, and said reaction product are discharged;
    a second partition means for partitioning between said second pipe portion and said reaction unit;
    a feed pipe through which reactant is supplied to said first pipe portion;
    a standby chamber between said feed pipe and said first pipe portion;

a first valve between said feed pipe and said standby chamber;
a second valve between said standby chamber and said first pipe portion;
a discharge pipe following said second pipe portion;
a pressure holding valve in-line with said discharge pipe;
a pressure feedback line between said discharge pipe and said standby chamber; and
a valve in said pressure feedback line,
wherein,
said high temperature is the same as or greater than the critical temperature for the fluid, and
said high pressure is the same as or greater than the critical pressure for the fluid.

2. A reactor as set forth in claim 1, wherein said first partition means is provided at an end part of said first pipe portion inside of said reaction unit.

3. A reactor as set forth in claim 1, wherein said first partition means opens under the weight of said reactant during the supply of said reactant from said first pipe portion to said reaction unit to supply said reactant to said reaction unit via said first pipe portion.

4. A reactor as set forth in claim 1, wherein said second partition means is provided at an end part of said second pipe portion inside of said reaction unit.

5. A reactor as set forth in claim 1, wherein said second partition means opens under the weight of any of said fluid, said reactant, and said reaction product during the discharge of any of them from said reaction unit to said second pipe portion to discharge any of said fluid, said reactant, and said reaction product to said second pipe portion.

6. A reactor as set forth in claim 1, further comprising a temperature controlling means for controlling temperature of said fluid and said reactant passing through said reaction unit, said controlling means being provided in said reaction unit.

7. A reactor as set forth in claim 1, comprising:
a fluid storage unit that stores fluid including water; a pressurizing unit that pressurizes said fluid to compress a volume of said fluid so that pressure of said fluid become said target reaction pressure;
a heating unit that heats said fluid introduced from said pressurizing unit so that the temperature of said fluid get closer to said target reaction temperature; and
a third pipe portion connected to said reaction unit, through which said fluid introduced from said heating unit is supplied to said reaction unit.

* * * * *